United States Patent [19]

Ritola

[11] Patent Number: 4,805,308

[45] Date of Patent: Feb. 21, 1989

[54] CHAIN SAW SAFETY DEVICE

[76] Inventor: Irvin W. Ritola, 23424 NE. Jehnsen Rd., Yacolt, Wash. 98675

[21] Appl. No.: 25,949

[22] Filed: Mar. 16, 1987

[51] Int. Cl.$^4$ .............................................. B23B 17/00

[52] U.S. Cl. ........................................ 30/382; 30/383

[58] Field of Search ................................... 30/381-387

[56] References Cited

U.S. PATENT DOCUMENTS 3,496,971 2/1970 Hale ..................................... 30/381

*Primary Examiner*—Douglas D. Watts

*Attorney, Agent, or Firm*—Stoel Rives Boley Jones & Grey

[57] ABSTRACT

The present invention comprises a chain saw safety device for use in preventing a broken saw chain from damaging the saw or injuring its operator. The device includes a rotatable roller and a mechanism for mounting the roller in alignment with the guide bar of the chain saw. The roller is aligned so as to intercept the saw chain should it become broken. The roller helps prevent the saw chain from pivoting back toward the operator and prevents the chain from gripping onto the saw and damaging it.

4 Claims, 2 Drawing Sheets

CHAIN SAW SAFETY DEVICE

BACKGROUND OF THE INVENTION

The present invention relates to chain saws and more particularly to safety devices for use in conjunction with such saws.

During operation the saw chain of a chain saw may occasionally become derailed from its guide bar. Such derailments may occur due to the chain breaking or foreign objects becoming lodged in the chain race or from other causes. In any event, the saw chain will usually drop downward and will often catch on the handle underneath the saw. Using the handle as a pivot the saw chain may then swing back and injure the operator or damage the saw itself.

It is therefore an object of the present invention to provide a safety device for a chain saw which protects against injury or damage upon chain derailments.

It is another object of the present invention to provide such a device which may be easily installed and readily removed from the saw.

It is a further object to provide such a device which is simple in design, economical to produce and durable in use.

SUMMARY OF THE INVENTION

The present invention constitutes a safety device for use in conjunction with a chain saw. The device comprises a roller positioned underneath the body of the saw and an assembly for rotatably mounting the roller on the front handle of the saw.

In operation, the roller functions to catch the saw chain if it derails and to spin around the handle. The saw chain is thereby substantially prevented from pivoting around the handle and swinging back toward the operator or damaging the saw.

DESCRIPTION OF THE PREFERRED EMBODIMENT

Figure 1:
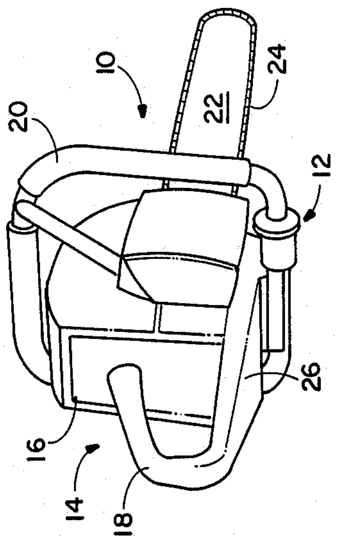
FIG. 1 is a overall perspective view of a chain saw with the present invention installed thereon.

Referring now to FIG. 1, a chain saw 10 is illustrated with the safety device 12 of the present invention installed thereon. The chain saw comprises a main body 14 including a housing 16 for the motor assembly and associated mechanisms, a rear handle 18, a front handle 20, and a guide bar 22 around which an endless saw chain 24 is driven by a sprocket (not shown). The front handle 20 comprises a hollow tubular pipe which wraps laterally around the main body 14 of the saw and extends along the underside 26 of the saw 10.

Figure 2:
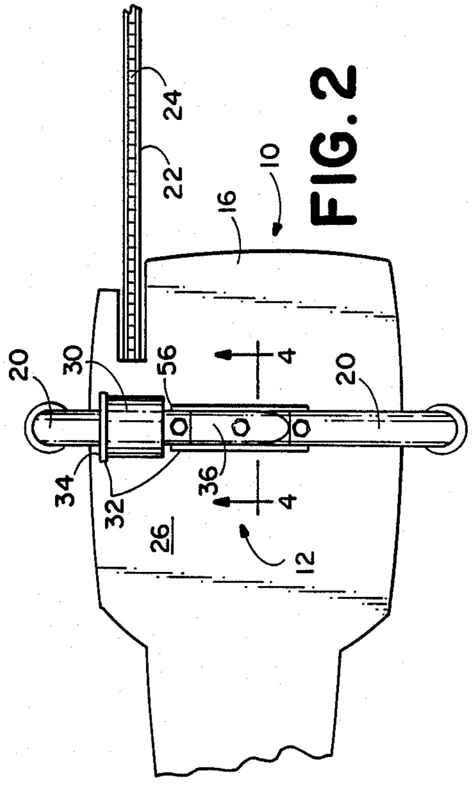
FIG. 2 is a plan view of the undesirable of a chain saw and the present invention as installed thereon.

Referring now to FIG. 2, the safety device 12 is shown in greater detail. The device 12 includes the roller 30 of high impact moldable plastic secured around the front handle 20 along the underside 26 of the saw 10. The roller 30 is aligned with the guide bar 22 so as to extend substantially perpendicularly through the plane defined by the guide bar 22 in order to be able to intercept the saw chain 24 should it become derailed.

Figure 3:
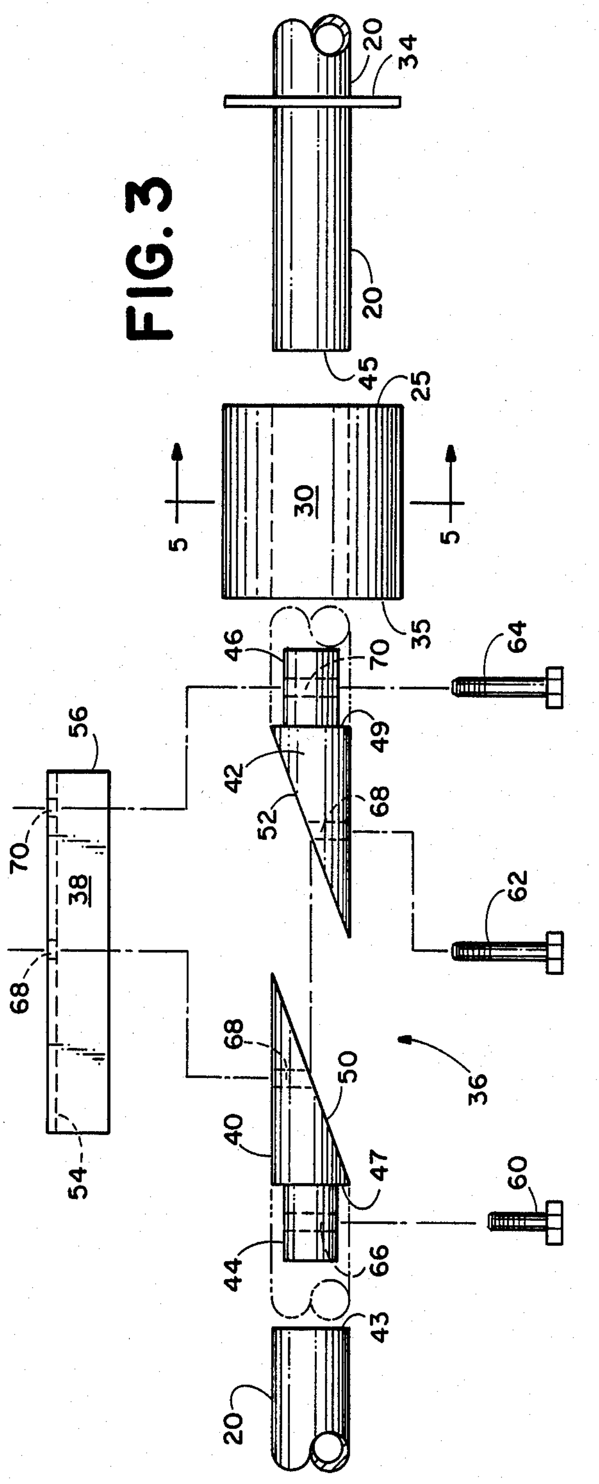
FIG. 3 is an exploded view of the present invention showing the components thereof.

Referring now also to FIG. 3, the roller 30 is held in place by the assembly 32 which removably mounts the roller 30 on the handle 20. The assembly 32 includes the retaining ring 34, the two-piece pipe joint 36 and the bracket 38. The retaining ring 34 is welded on the handle 20 adjacent to the outward end 25 of the roller 30. The two-piece joint 36 is formed form two parts 40 and 42. The parts 40 and 42 include stub ends 44 and 46 of reduced diameter which terminate in shoulders 47 and 49 and matching chamfered ends 50 and 52 adapted to fit together and form a scarf joint. The stub ends 44 and 46 fit into the ends 43 and 45 of the tubular pipe of the handle 20 to form an easily replaceable section which allows the roller 30 to be readily mounted and removed from around the handle 20. The bracket 38 includes a semicircular depression 54 cut in one of its longitudinal surfaces which conforms to the shape of the handle 20. The bracket 38 fits between the pipe joint 36 and the underside 26 of the saw 10. The bracket supports the pipe joint 36 and handle 20 in position below the saw 10. The edge 56 of the bracket 38 abuts the inward end 35 of the roller 30 and cooperates with the retaining ring 34 to hold the roller 30 laterally in position on the handle 20 while allowing the roller 30 to spin freely around the handle 20.

Three bolts 60, 62, and 64 are mounted through holes 66, 68, and 70 in the handle 20, pipe joint 36 and bracket 38 and in the case of bolts 62 and 64 into the housing 16 of saw 10. The bolt 60 extends through the end 43 of the handle and the stub end 44 of the pipe joint 36 and screws into bracket 38. The bolt 62 extends through chamfered ends 50 and 52 of the parts 40 and 42 into the housing 16. The bolt 64 extends through the end 45 of the handle 20 and the stub end 46 of the pipe joint into the housing 16. The bolts 60, 62, and 64 secure the pipe joint 36, bracket 38, handle 20, and roller 30 in position.

Figure 4:
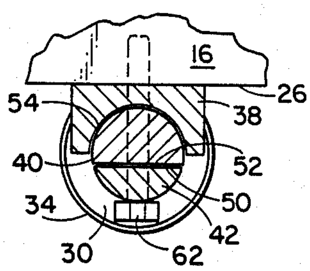
FIG. 4 is a cross sectional view along lines 4—4 of FIG. 2 showing various parts of the mounting assembly of the present invention.

Referring now to FIG. 4, the construction of the assembly 32, joint 36, and bracket 38 are further illustrated. The parts 40 and 42 of the joint 36 are secured together along their chamfered ends 50 and 52. The part 40 fits in the semicircular depression 54 in the bracket 38. The bracket 38 is attached to the housing 16 on the underside 26 of chain saw 10. The bolt 62 secures joint 36 and bracket 38 to the housing 16.

Figure 5:
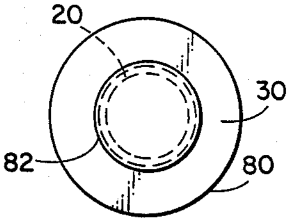
FIG. 5 is a cross sectional view along lines 5—5 of FIG. 3 showing the roller component of the present invention.

FIG. 5 further illustrates the construction of the roller 30. The roller 30 is defined by a circular inner surface 74 and a circular outer surface 76. When installed on the handle 20 (shown in phantom in FIG. 5) the inner surface 74 of the roller 30 fits loosely around the outer surface of the pipe which forms the handle 20.

In operation, the roller 30 functions to catch the saw chain 24 when it becomes derailed and to allow rotation around the handle 20 in order to help prevent the saw chain 24 from using the handle as a pivot point to swing back toward the operator. The operator and chain saw are thereby protected against injury and damage.

Figure 6:
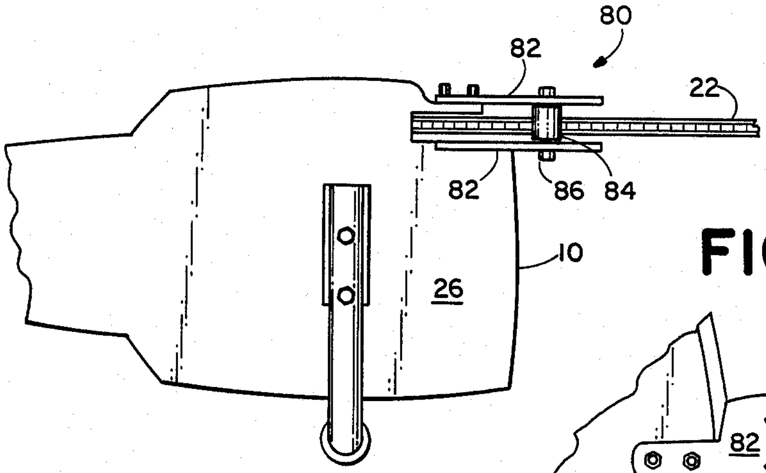
FIG. 6 is a plan view of the underside of a chain saw with an alternate embodiment of the present invention installed thereon.
Figure 7:
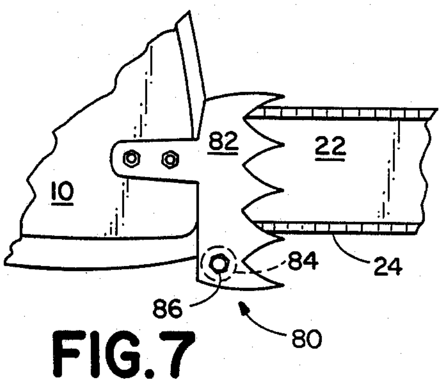
FIG. 7 is a side view of a chain saw with an alternate embodiment of the present invention installed thereon.

Referring now to FIGS. 6 and 7, a device 80 comprising an alternate embodiment of the present invention is shown secured on a chain saw 10 which does not have a wrap-around handle. The device 80 is mounted under and in lateral alignment with the guide bar 22 along the front of the saw 10. The device 80 is secured between a pair of dogs 82 which are located on opposite sides of the bar 22. The dogs 82 comprise metal plate structures having sets of forwardly inclined teeth which may be employed to grip the wood being sawed. In the present case, the dogs 82 also act as the mounting bracket of the device 80. The roller 84 is laterally mounted on an axle 86 which extends between the dogs 82 and around which the roller may freely rotate. The device 80 also serves to catch the saw chain 24 should it break or become derailed.

As may be apparent from the preceding description, certain changes may be made in the above constructions without departing from the scope of the invention. For example, the roller of the present invention may be mounted by a number of different constructions and so long as it is properly aligned with the guide bar and saw chain the present invention should operate effectively. Therefore, the embodiments described and the drawings are intended to be illustrative only and are not meant to be interpreted as limiting the following claims.

I claim:

1. A safety device for use in conjunction with a chain saw having a front handle extending transversely around the main body of said saw and a saw chain extending forward from said main body and around a guide bar that defines a plane, comprising:

a roller positioned underneath said main body of said saw so as to extend through said plane defined by said guide bar; and an assembly for rotatably mounting said roller on said front handle of said saw, said assembly including a detachable joint adapted to form a removable section in said handle, means for laterally retaining said roller in position on said handle, and a bracket for securing said joint and said handle to said main body of said saw.

2. The device of claim 1, wherein said roller is comprised of high-impact plastic material.

3. A safety device for use in conjunction with a chain saw having a front handle extending transversely around the main body of the saw and a saw chain extending forward from said main body around a guide bar, said device comprising:

a roller positioned underneath said body of said saw so as to extend through the plane defined by said guide bar; and an assembly for rotatably mounting said roller on said front handle of said saw including:

a two-piece pipe joint which is adapted to form a removable section in said handle, means for laterally retaining said roller in position on said handle, and a bracket for securing said pipe joint and said front handle to said body of said saw.

4. The device of claim 3, wherein said roller is comprised of high-impact plastic material.

* * * * *